May 23, 1933.  R. V. GRAYSON  1,910,009
APPARATUS FOR FREEZING LIQUIDS IN VACUO
Filed Dec. 20, 1930   2 Sheets-Sheet 2
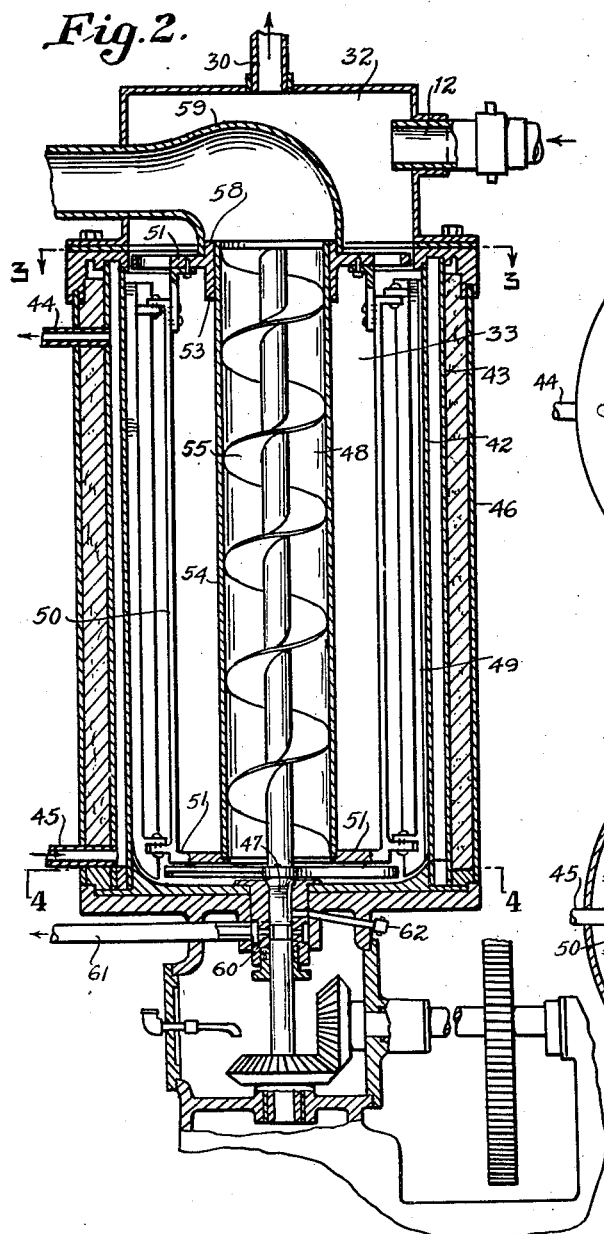
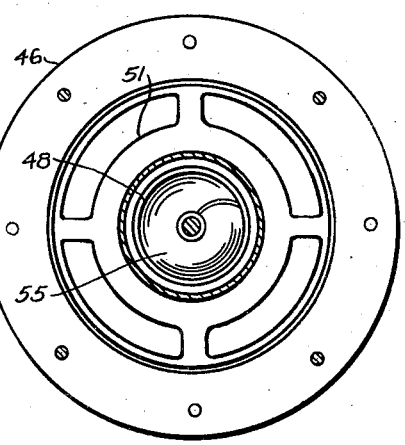
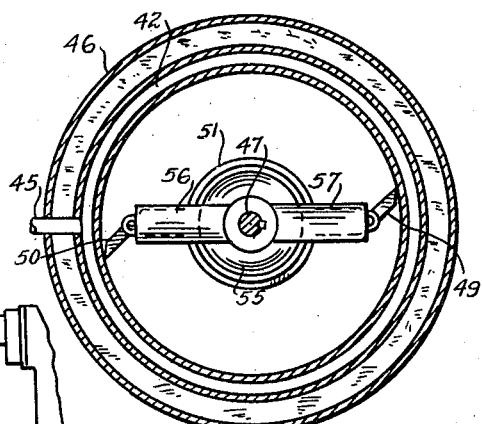
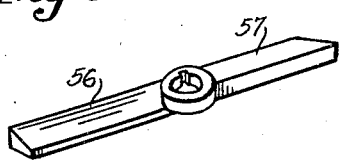
Inventor
Ralph V. Grayson
By Mason Fenwick Lawrance
Attorneys Patented May 23, 1933

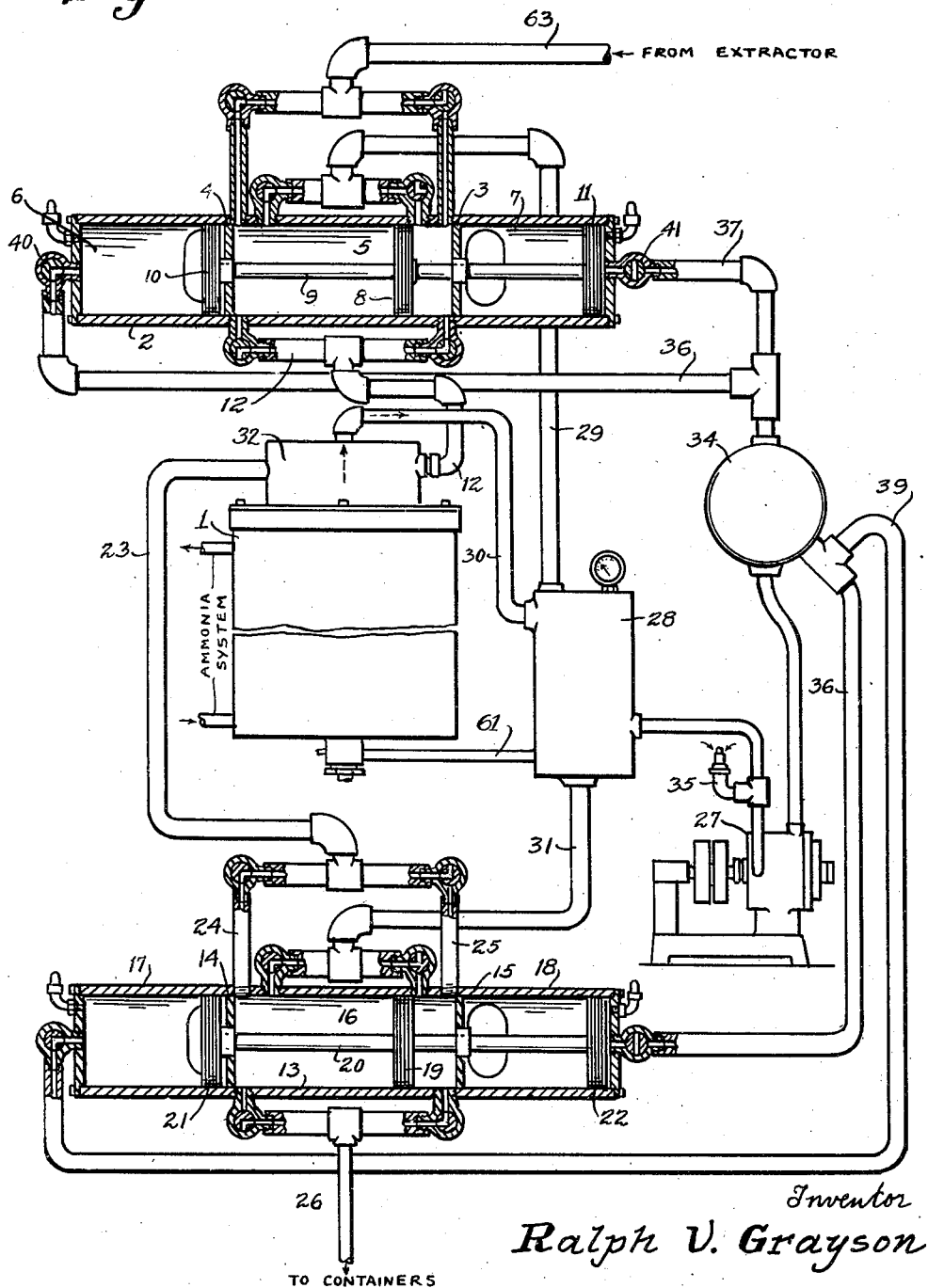

1,910,009

UNITED STATES PATENT OFFICE

RALPH V. GRAYSON, OF ATLANTA, GEORGIA

APPARATUS FOR FREEZING LIQUIDS IN VACUO

Application filed December 20, 1930. Serial No. 503,829.

This invention relates to apparatus for freezing liquids in vacuo, and it has for its principal object the provision of a mechanical unit in which a freezer constitutes the predominant element, said freezer being co-ordinated with a charging reservoir and a discharging tank, said freezer, reservoir and tank being maintained in an evacuated state throughout the traverse of the product, in both its liquid and frozen state therethrough, there being means for positively charging the freezer and positively emptying the discharge tank without releasing the vacuum prevailing in any of these elements.

Another object of the invention is the provision of a novel freezer in which the product in vacuo travels contra-flow in coaxial columns, the outer column being frozen by an expanding refrigerant in the jacket of the freezer, while freezing progresses in the central column through heat exchange with the outer surrounding column.

A further object of the invention is the provision in connection with the freezer of a novel lubricated bearing in which the vacuuum on the opposite sides of the lubricant is balanced so as to prevent the lubricant being drawn into the freezer.

Other objects of the invention will appear as the following description of a preferred and practical embodiment of the invention proceeds.

In the drawings:

Figure 1 is a diagrammatic view showing in vertical elevation and partly in section, a lay-out including the essential elements of the invention;

Figure 2 is a vertical section through the freezer;

Figure 3 is a section taken along the line 3—3 of Figure 2;

Figure 4 is a section taken along the line 4—4 of Figure 2; and

Figure 5 is a perspective view of the reversely bevelled lifting blades in the bottom of the freezer.

Referring now in detail to the several figures, and referring first to the complete assembly shown in Figure 1, the numeral 1 represents the freezer which receives the liquid to be frozen from a charging cylinder 2. The present apparatus is particularly, although not exclusively, adapted to the freezing of citrus fruit juices in raw state for packaging, and the charging cylinder 2 receives the fruit juices through a conduit 3 leading from the extractor.

In my copending application Serial No. 492,533 is disclosed a system for pre-cooling the fruit juices in vacuum prior to their reaching the freezer or its appurtenant mechanism as herein shown, but the present invention is independent of the invention disclosed in said copending application, since while desirable, it is not essential that the fruit juice be protected from air until it reaches the charging cylinder.

Before proceeding with a further detailed account of the apparatus constituting the present invention, it may be stated in advance that the object of freezing the fruit juice in vacuo is two-fold, first to isolate it from air so as to prevent oxidation of the juice which is responsible for deterioration in the flavor of the juice. Secondly, the object of treating the juice in vacuo is to abstract from the juice such oxygen as it may have absorbed or which may have become entrained in the juice in the operation of extracting it from the fruit or in any subsequent handling in which it may have been exposed to air.

The charging cylinder 2 is provided with heads 3 and 4 defining a central juice chamber or charging reservoir 5 and motive air chambers 6 and 7 on the outside of said heads and therefore exterior to said juice chamber. A piston 8 traverses said juice chamber, said piston being connected to a rod 9 passing through the heads 3 and 4, and being fixed at its outer ends to motive pistons 10 and 11. Said motive pistons as will be presently described actuate the rod 9 so as to reciprocate the piston 8 within the juice chamber. Valved branches of the juice conduit 63 communicate with the cylinder 2 in the juice chamber at extreme ends thereof on opposite sides of the piston 8. A valved pipe 12 communicates with the juice chamber at its bottom or opposite sides of the piston 8 at the extreme ends of said juice chamber and discharges into the freezer 1.

In the position of the piston shown in Figure 1, it has moved toward the right, progressively creating a space which has been filled with juice flowing in from the conduit 3. At the same time, juice which had previously occupied the space at the right of the piston 8 has been forced through the conduit 3 into the freezer.

In due course, the valves in the branch juice conduits and the valves in the pipe 12 will have reversed, and the piston 8 on its return trip will discharge the juice which occupies the space in the juice chamber on its left, into the freezer, at the same time creating a space on its right which is filled by juice from the conduit 3.

Referring now to the structure below the freezer, a discharge tank 13 is shown, which may be identical in all respects with the charging reservoir 2; that is to say, the discharge tank has heads 14 and 15 defining a central juice chamber 16 and it is provided with extensions 17 and 18 constituting motive cylinders. A piston 19 traverses the juice chamber, being fixed to a rod 20 which passes through the heads 14 and 15 and has affixed thereto in the motive cylinders 17 and 18, heads 21 and 22 which impart movement to the piston 19 in a manner presently to be explained in connection with a similar function by which the piston 8 in the charging reservoir is reciprocated.

The juice frozen into slush in the freezer 1 flows through the conduit 23 into branch conduits 24 and 25 which communicate with the juice chamber 16, entering the latter adjacent its extreme ends on opposite sides of the piston 19. Valves in the conduits 24 and 25 are so arranged and actuated that when one is open the other is closed so that the juice can only find access to one side of the juice chamber at a time. The piston moves from one side to the other creating a space on one side which is filled with the frozen juice, and discharging the frozen juice by displacing it from the space on the other side. The juice therefore discharges alternately from opposite sides of the juice chamber into the pipe 26. Valves are in the branches of the pipes 26 and are so actuated that the one on the side which is at the time filling is closed so as to prevent entrance of atmospheric air into the juice chamber.

Now, referring in detail to the vacuum system which imposes a constant vacuous condition upon the juice chambers in both the charging reservoir and the discharging tank and the freezing chamber of the freezer, the vacuum is produced by any suitable means such as the pump 27. Said pump exhausts the air from a manifold 28 which manifold communicates by means of conduits 29, 30 and 31, respectively, with the juice chamber of the charging reservoir, the vacuum header 32 of the freezer and the juice chamber 16 of the discharging tank.

The conduit 29 divides into valved branches communicating with the juice chamber 5 on opposite sides of the piston 8. The valves in the branches of said conduit coordinate with the valves in the branches of the juice conduit 3 in such manner that the vacuum conduit is open to that side of the juice chamber which is filling, but closed to that side which is discharging. The reason for this arrangement is obvious, for if the vacuum conduit on the discharging side of the piston 8 were left open, juice would be drawn into the vacuum system.

The connection of the conduit 30 with the vacuum header 32 of the freezer may best be observed from Fig. 2, and it will be noted that the vacuum header 32 is in communication with the freezing chamber 33 of the freezer.

The vacuum conduit 31 divides into valved branches which communicate with the juice chamber of the discharge tank in a manner precisely similar to that in which the conduit 29 is related to the juice chamber 5 of the charging reservoir.

The motive power which actuates the pistons 10 and 11 in the charging reservoir and the pistons 21 and 22 in the discharging tank is derived from the discharge side of the pump 27. The air which is drawn out of the juice chambers 5 and 16 and the freezer 1 is stored in a reservoir 34. Since after the apparatus has run for sometime there would be but little air drawn from these sources, it will not be sufficient alone, for power purposes. Consequently, the pump is of that type which after a certain degree of vacuum has been attained in the chambers 5, 16 and the freezer, takes in atmospheric air from a valve 35 and this air also is stored under pressure in the reservoir 34. Said reservoir communicates by means of conduits 36 and 37 with opposite sides of the motive cylinders 6 and 7, and by conduits 38 and 39 with opposite sides of the motive cylinders 17 and 18. Valves 40 and 41 in the conduits which lead to the cylinders 6 and 7 are so coordinated as to alternately open, admitting compressed air in proper sequence to the pistons 10 and 11 and by this means reciprocating the piston 8. In similar manner, air is admitted alternately to the cylinders 17 and 18 in the discharge tank for the actuation of the pistons 21 and 22.

Referring now to Figures 2, 3, 4 and 5, in which the specific construction of the freezer is illustrated, it comprises a cylindrical tank having an inner wall 42 defining a freezing chamber, an intermediate wall 43 defining between itself and the wall 42 an expansion space forming the expansion element of a Carnot cycle refrigeration system such as of the ammonia type, the pipes 44 and 45 representing the connections of said chamber to said system. The freezer further comprises an outer wall 46 between which and the wall 43 suitable insulating lagging such as cork is packed.

A drive shaft 47 enters the freezer at the bottom and drives a central tubular elevator 48 and a peripheral set of oppositely disposed scrapers 49. Said scrapers are pivotally mounted in a frame 50 comprising upper and lower spiders 51 and 52. The upper spider as is clearly shown in Figure 3 bears against the sides of the freezer and is provided with an annular collar 53 forming a bearing for the upper end of the tubular elevator. The lower spider is suitably driven from the drive shaft 47. The tubular elevator comprises a cylindrical outer wall 54 housing a helical flight 55 which is secured to an axial extension of said drive shaft and preferably to the tubular wall of said elevator. The tubular elevator is open at its bottom and top. A pair of oppositely disposed inclined blades 56 and 57 rotate with the drive shaft at the bottom of the freezer and partly beneath the open end of the elevator and tend to initially lift the frozen slush into the mouth of the elevator. The upper spider 51 is provided with a projecting flange 58 over which fits a discharge hood 59 emerging from the freezer through the wall of the vacuum header 32. The outer end of the hood 59 communicates with the conduit 23 shown in Figure 1, which discharges into the juice chamber of the discharge tank.

The operation of the freezer is as follows: juice isolated from atmosphere by vacuum enters the vacuum chamber 32 by way of the pipe 12. It descends into the freezing chamber 33 and is mildly agitated by the rotation of the scrapers 40. These scrapers act in a manner similar to the scrapers of an ice cream freezer in scraping the frozen film from the inner wall of the freezing chamber and diverting it toward the center of the mass of juice in the freezing chamber. The mild agitation has the effect of breaking the juice up into portions having extended surfaces which being intimately presented to the vacuum, are freed from their entrained and absorbed content of air. This practically completely de-aerates the juice.

The action of the elevator causes an upward flow of the frozen product in the elevator and a corresponding descent of the freezing juice in the freezing chamber 33 outside of the elevator. By the time the juice reaches the bottom of the elevator it is frozen into a soft slush which is picked up by the blades 56 and 57 introduced into the tubular elevator and carried upwardly to the top of the freezer, the freezing progressing throughout its entire travel of the freezer. When the frozen product reaches the hood 59, it is a slush frozen to the proper consistency to flow through the conduit 23 and its branches into the juice chamber 16.

The mild agitation of the juice in the freezing chamber and its contra-flow progression through said chamber has the advantageous effect of keeping the juice in homogeneous state, preventing separation of certain of the juice constituents such as takes place in still freezing.

At the same time, it must be borne in mind that since the agitation and freezing takes place in vacuum, there is no incorporation of air into the juice analogous to the "over-run" which takes place in the freezing of ice cream.

The problem of lubricating the drive shaft in apparatus of this nature in which the internal vacuum would ordinarily tend to draw the lubricant into the freezer and contaminate the juice, is solved in the present instance by forming an annular channel 60 either in the drive shaft as shown or preferably in the bearing itself between the point of lubrication and atmosphere, and connecting this channel to the general vacuum system by means such as the tube 61. The point of lubrication is indicated by the grease cup 62 and it will be understood that with a balanced vaccum on both sides of the point of lubrication there will be no tendency for the lubricant to be sucked into the freezer.

In a unit of the type described, the freezer is charged by positive means, thus avoiding those difficulties encountered in attempting to discharge a fluid medium from a vessel which is under a vacuous pressure, this being true also of the discharge means.

It is to be understood that while I have in the above disclosure omitted the showing of mechanism by which the valve movements are synchronized so as to produce the desired sequence of operation, yet the provision of such mechanism is in the province of the machine designer and does not involve the completeness of the invention as shown.

It is also to be understood that the details of construction as shown are merely by way of example and not to be construed as limiting the scope of the invention as claimed.

What I claim is:

1. Apparatus for freezing liquids in vacuo comprising a charging reservoir, a freezer, means for maintaining vacuum in said reservoir and freezer, and means for positively charging the contents of said reservoir into said freezer.

2. Apparatus for freezing liquids in vacuo, comprising a charging reservoir, a freezer and a discharge tank, means for maintaining vacuum in said three elements, means for positively charging the contents of said reservoir into said freezer, and means for positively emptying said discharge tank.

3. Apparatus for freezing liquids in vacuo as claimed in claim 2, the positive charging and emptying means comprising a rigid element.

4. Apparatus for freezing liquids in vacuo comprising a charging reservoir and a freezer, means for maintaining vacuum in said reservoir and freezer, and mechanical means for displacing the contents of said reservoir and charging it into said freezer, said latter means being actuated by said vacuum maintaining means.

5. Apparatus for freezing liquids in vacuo comprising a charging reservoir and a freezer, a piston for displacing the contents of said reservoir and charging it into said freezer, a pump having its induction side connecting with said reservoir and freezer for maintaining a vacuum in said elements, and means for impressing the fluid pressure of the eduction side of said pump upon said piston for actuating the latter.

6. Apparatus for freezing liquids in vacuo comprising a charging reservoir and a freezer, said reservoir including a cylinder having an intermediate juice chamber communicating with said freezer, a piston reciprocable in said juice chamber, pistons in the portions of said cylinder extraneous to said juice chamber, to which the first named piston is mechanically connected, a pump having its induction side in communication with said juice chamber and freezer for maintaining vacuum therein, means connecting the discharge side of said pump to the portions of said cylinder extraneous to said juice chamber for actuating the pistons in said extraneous portions for reciprocating the piston in said juice chamber.

7. Apparatus for freezing liquids in vacuo comprising a charging reservoir, a freezer and a discharge tank adapted to be placed in serial communication, said charging reservoir and said discharge tank each including a cylinder, each having heads therein defining intermediate juice chambers and extraneous air chambers, said juice chambers being in communication with said freezer, a piston in each juice chamber, a rod on said piston extending through the heads which define said juice chamber, pistons on said rods in said extraneous air chambers, an inlet for the juice chamber of said reservoir and an outlet for the juice chamber of said discharge tank, a pump communicating with said juice chambers on opposite sides of the pistons within said juice chambers and communicating with said freezer for maintaining a vacuum in said juice chambers and freezer, means for connecting the eduction side of said pump to the air chambers at the ends of said reservoir and discharge tank for actuating the pistons in said juice chambers through fluid pressure exerted against the pistons in said air chambers, and means for determining the alternate actuation of the pistons in said reservoir and in said discharge tank.

8. Apparatus for freezing liquids in vacuo as claimed in claim 7 including a drive shaft for said freezer, a bearing for said drive shaft, means for lubricating said bearing and a vacuum connection between the point of lubrication and atmosphere for balancing the vacuum at both sides of said point of lubrication.

9. Apparatus for freezing liquids in vacuo as claimed in claim 7, including a header intercalated between the induction side of said pump and the vacuum conduits communicating with the several elements for equally distributing the vacuum, and a reservoir in communication with the eduction side of said pump for storing the fluid pressure distributed to the air chambers of said first-named reservoir and discharge tank.

10. Apparatus for freezing liquids in vacuo as claimed in claim 7, including a manifold in communication with the induction side of said pump for distributing vacuum to the chambers at the ends of said first-named reservoir and discharge tank, said pump having an air inlet set to open upon the attaining of a predetermined attenuation in said reservoir freezer and discharge tank for supplying additional air to said second-named reservoir.

In testimony whereof I affix my signature.
RALPH V. GRAYSON.